June 23, 1936.  P. M. BOURDON  2,045,341

SAFETY DEVICE FOR TIRES

Filed April 27, 1934  3 Sheets-Sheet 1

Inventor
Pierre Marcel Bourdon
By Wilkinson & Mawhinney
Attorneys.

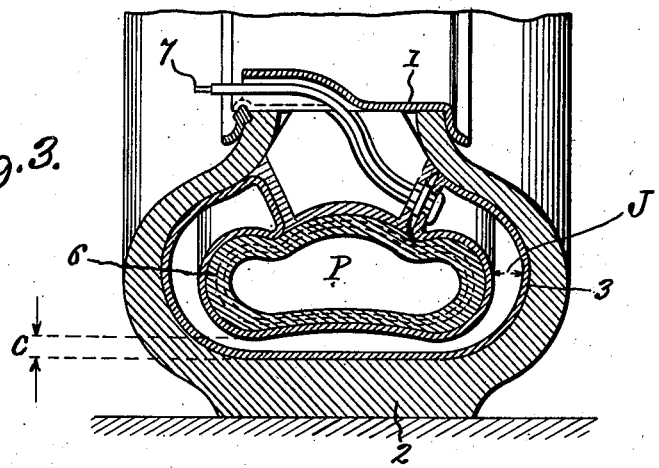
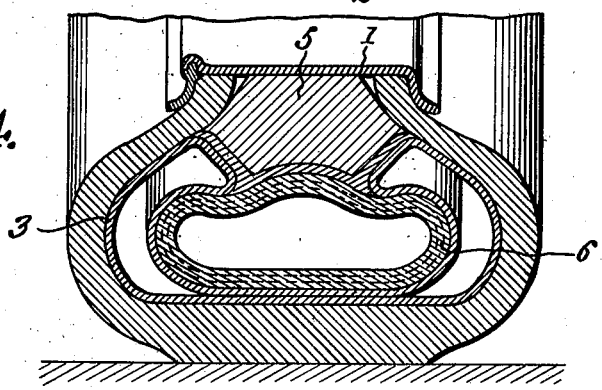
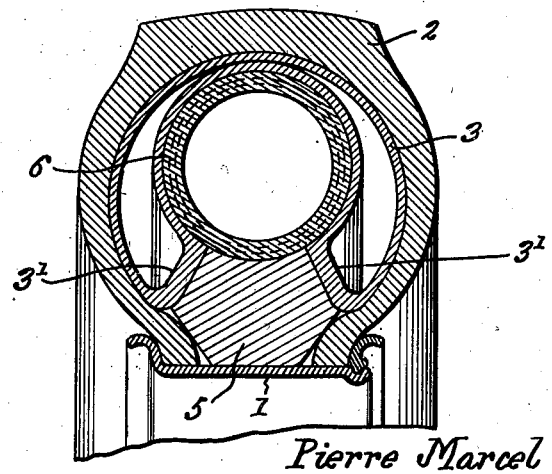

June 23, 1936. P. M. BOURDON 2,045,341
SAFETY DEVICE FOR TIRES
Filed April 27, 1934 3 Sheets-Sheet 3

Inventor
Pierre Marcel Bourdon
By Wilkinson & Mawhinney
Attorneys.

Patented June 23, 1936

2,045,341

UNITED STATES PATENT OFFICE 2,045,341

SAFETY DEVICE FOR TIRES

Pierre Marcel Bourdon, Paris, France, assignor to Michelin et Cie, Clermont-Ferrand, France, a corporation of France Application April 27, 1934, Serial No. 722,800
In France May 10, 1933

4 Claims. (Cl. 152—22)

The present invention relates to pneumatic tires, and more particularly to an improved safety device therefor, and means for mounting the safety device in the tire.

An object of the present invention is to provide a safety device which may be used with the conventional rim and shoe of a pneumatic tire for use on motor vehicles, rail cars and the like and which does not have any projecting parts or formations likely to interfere with rail plates or parts or portions of the vehicles carrying the safety devices.

There are a number of known prior devices having this object in view to limit the lowering of the tires when deflated for various reasons. Chiefly among these prior devices are the rigid and elastic annular supports to take up the load upon the deflation of the pneumatic tire, but all of these prior devices have various disadvantages which may be divided into the following three main and sub-divided groups:

1. They have various disadvantages under normal conditions, that is, when the pneumatic tire is fully inflated and carrying its load, such as:

(a) The presence of a safety device in a tire reduces size of the air receiving chamber and increases the sensitivity of the small volume of air to temperature changes and to small leaks, which would be only slightly felt with a tire of great air volume.

(b) The construction of certain of these prior safety devices is such that they are practically a part of the tire and cause, during travel, a rise in temperature injurious to the tire and a loss of traction and motive power.

(c) To reduce the lowering of the tire in case of deflation, it is necessary to limit the space between the inner surface of the tire and the supporting surface therefor upon deflation, and this supporting surface is relatively hard in prior devices. Consequently, this provides and produces abrupt shoulders, edges, ridges and the like resulting in the rupture of the tire fabric and the bursting and destruction of the tire. Also this form of safety device produces, in travel, distinctive and discomforting vibrations when the tire is deflated.

2. Certain forms of safety devices produce, in travel when the tire is deflated, destructive, dangerous, and discomforting vibrations as follows:

(a) To reduce the lowering of the tire, one type of device decreases the flexibility of the safety means on which the tire rests when deflated, and this may have serious consequences. In fast travel, after a short distance the result is deterioration of the safety means itself and rupture of the tire fabric, to say nothing of the shaking up of the passengers in the vehicle and the actual dangers to which they are subjected. If, on the other hand, it is desired to save the tire and the safety means and reduce risks, it is necessary to considerably reduce the speed of the vehicle.

(b) In order to maintain the speed of the vehicle without destruction of the tire, the safety means has been given a greater flexibility, but in such cases, the tire when deflated drops through a greater distance with other disadvantages and risks which are readily apparent, such as the steering becomes hard and the braking becomes dangerous. In the case of rail vehicles, the guiding flanges may come into contact with the fish plate bolts and other parts of the track, defeating the desired objects.

3. The disadvantages in adapting these prior safety devices to wheels and tires of the present day type.

For the most part the existing safety devices, due to their construction, cannot be very easily applied to tires and wheels as now used. This necessitates the making of a special tire and wheel with the natural cost increase to the manufacturer.

The present invention has for an object a construction which remedies the above disadvantages by a device which is of a highly practical nature.

The device of this invention permits riding for a long distance and at high speed with a deflated tire, without impairing the tire and without harmful effects to the comfort and safety of the passengers.

Briefly stated, the present safety device provides a support to lie between the beds of a casing and on which is mounted a fabric reinforced air tube proportioned when inflated to deform itself between the support and the tread portion of the casing before the latter is inflated, and to provide separate valves for the casing and the air tube so that both the casing and air tube may be inflated independently one of the other to the desired relative pressures.

With the foregoing and other objects in view, the invention will be more fully described hereinafter, and will be more particularly pointed out in the claims appended hereto.

In the drawings, wherein like symbols refer to like or corresponding parts throughout the several views:

Figure 3 is a similar view showing both parts inflated and subjected to a load and with the casing tread in contact with a road or rail.

Figure 4 is another like view but with the outer part or casing deflated and subjected to a load.

Figure 5 is a transverse sectional view of a slightly modified form, and

Figure 1:
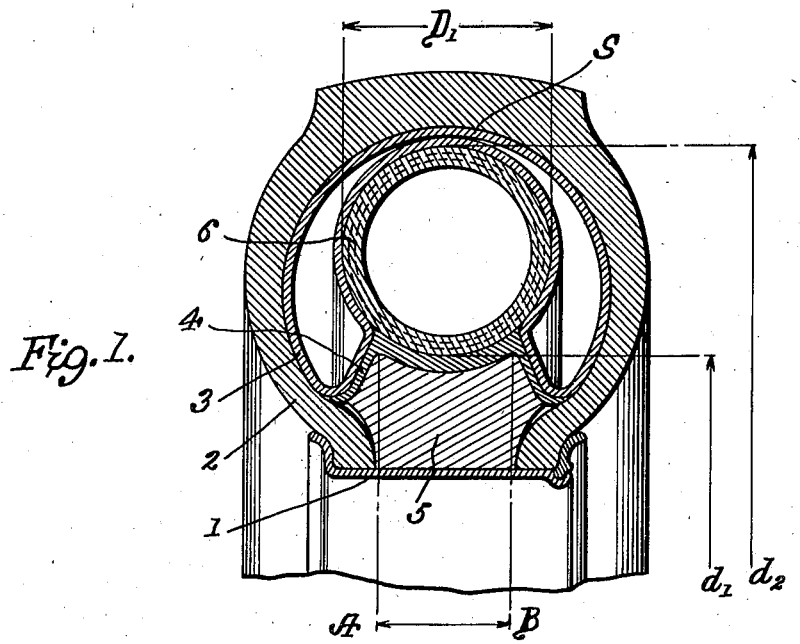
Figure 1 is a transverse section taken through a rim with its casing having the safety device of this invention mounted therein, the inner air tube being inflated and the casing being deflated.

Referring now to the drawings, 1 designates a wheel rim shown as of the straight side type, although any type rim may be used. Mounted in the usual manner on the rim 1 is a tire casing or shoe 2 of desired construction and form, and which has an inner tube 3 of special shape to accommodate the safety device of this invention.

An annular rigid support 5 is seated on the rim 1 between the beads of the casing 2, and this support may be of any desired construction to facilitate mounting in the conventional tire and to perform its desired functions. An air tube 6, suitably reinforced as by layers of canvas cords or other fabric, is mounted on the support 5 and the latter may be transversely shaped at its periphery to conform to the inner annular face of the air tube 6. A protecting or cushioning flap 4 is interposed between the support 5 and the air tube 6, and preferably has side extensions which cover the opposite sides of the support 5 and overlap the joints between the latter and the side walls of the casing 2 as clearly shown in Figures 1 and 2. The inner tube 3 of the shoe 2 is shaped to lie not only against the inner wall of the casing 2, but also over the sides of the flap 4 and about the air tube 6 except where seated on the flap 4.

A valve 8 leads through the support 5 to the air tube 6 and with nut 9 secures the tube upon the support 5 and the rim so that the latter may be inflated independently of the casing 2, while a valve 7 leads in a suitable manner as shown in Figure 3 from the interior of the shoe 2 to supply air thereto independently of the air pressure supply to the air tube 6. The cross sectional area of the air tube 6 changes but little under inflation similar to a normal tire, but of course being of considerably weaker construction. This air tube 6 is so constructed that if it were used alone without an enclosing tire 2, it would stand considerable pressure, such as a pressure of from 1 to 12 kilos without bursting as against an ordinary inner tube somewhat similar to the tube 3, which could not carry some ten grams of pressure without bursting and after being greatly expanded.

The layers of fabric comprising the core of the air tube 6 are so arranged that when the tube 6 alone is inflated its inner diameter $d'$ diminishes notably as the inflation pressure increases. If the tube 6 is mounted on the rigid annular support 5 so that the tube 6 has a slight initial clamping action on the annular surface A—B of the support 5 (with or without the flap 4), the clamping on this surface A—B increases with the increase in pressure in the tube 6. At the same time, the diameters D' and $d^2$ are increased slightly because of the deformation of the threads of the core.

The outer diameter $d^2$ of the tube 6 is such that when it is mounted deflated on the support 5 it has slight contact at S against the shoe. When the tube 6 is inflated, the diameters D' and $d^2$ increase slightly in such a way that the slight contact at S is transformed into an increasing clamping action.

The inner tube 3, which does not entirely enclose the reinforced air tube 6, may be constructed in the manner disclosed in the French Patent No. 709,294, of January 14, 1931, and its addition No. 40,325, of May 26, 1931, both by the same inventors.

In the form shown in Figures 1 to 4, the flap 4 is provided, but it may be eliminated if desired as shown in Figure 5, and in the latter case, the inner tube or lining 3 may be reinforced at 3' to prevent pinching and destruction of the lining.

Should the support 5 be made in a number of parts, the flap 4 or the reinforcing walls 3' serve to prevent damage to the inner tube 3 by contact with sharp edges or projecting into crevices occurring between the parts. The shoe 2 is of conventional form, and the rim is also of any desired type having suitable passages for the valve stems 7 and 8 and any fastening means which may be desired for the support 5 as brought out in the above mentioned French patent of addition.

In operation, when the safety device is mounted in the tire, the air tube 6 is first inflated to a pressure $p$ (Figure 1), leaving the outer chamber at substantially atmospheric pressure. Under this condition, there exists at S a contact or light clamping action between the tread portions of the inner and outer resilient members 6 and 2, and the volume of the inner member or tube 6 is now equal to V.

Then the outer chamber or tube 3 is inflated to a pressure P which is greater than the pressure $p$ in the inner member, and the air in the inner member 6 is also raised to the pressure P. This results in a decrease in the volume in the air tube 6 and results in a decrease of V to a lower volume $v$, or $pV=Pv$ (see Figure 2).

Figure 2:
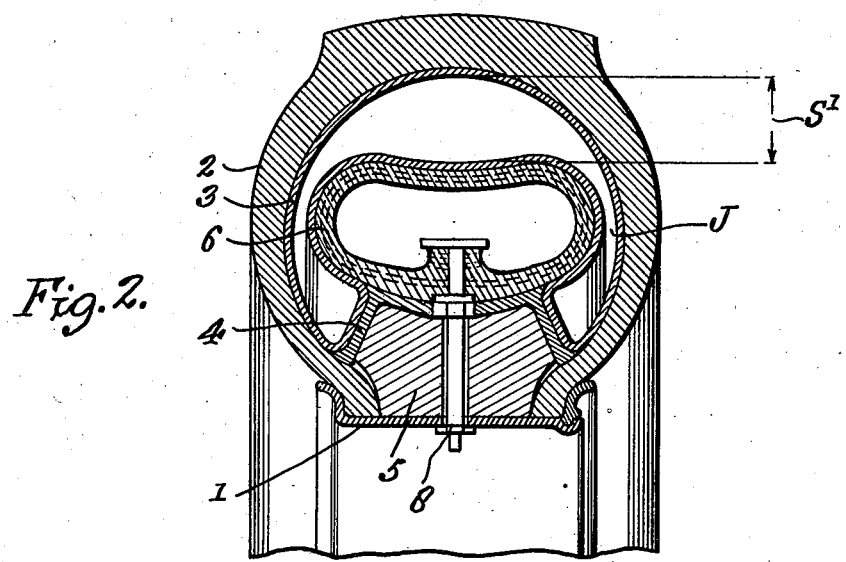
Figure 2 is a like view with both the air tube and the casing being inflated but not subjected to a load.

One of the peculiarities of this invention is that the pressure $p$ with respect to P is selected so that when V becomes $v$, it creates a free space S', Figure 2, equal to or slightly greater than the normal depression of the tire 2 under riding load corresponding to the inflation pressure P.

The various dimensions of the parts are so calculated that when the air tube 6 is in the position shown in Figure 2, there is a certain play or spacing J between the inner side walls of the outer shoe 2 and the adjacent walls of the air tube 6. It should be noted that the free space $S^1$ is formed because the inner tube 3 does not entirely enclose the air tube 6 and because the reduction in volume of the air tube 6 passing from V to $v$, can only be obtained by a decrease of the outer diameter $d^2$ of the tube 6, the inner diameter $d'$ of the tube 6 being fixed and because the mean perimeter of the section of the air tube 6 remains nearly constant due to its fabric core construction.

Figure 6:
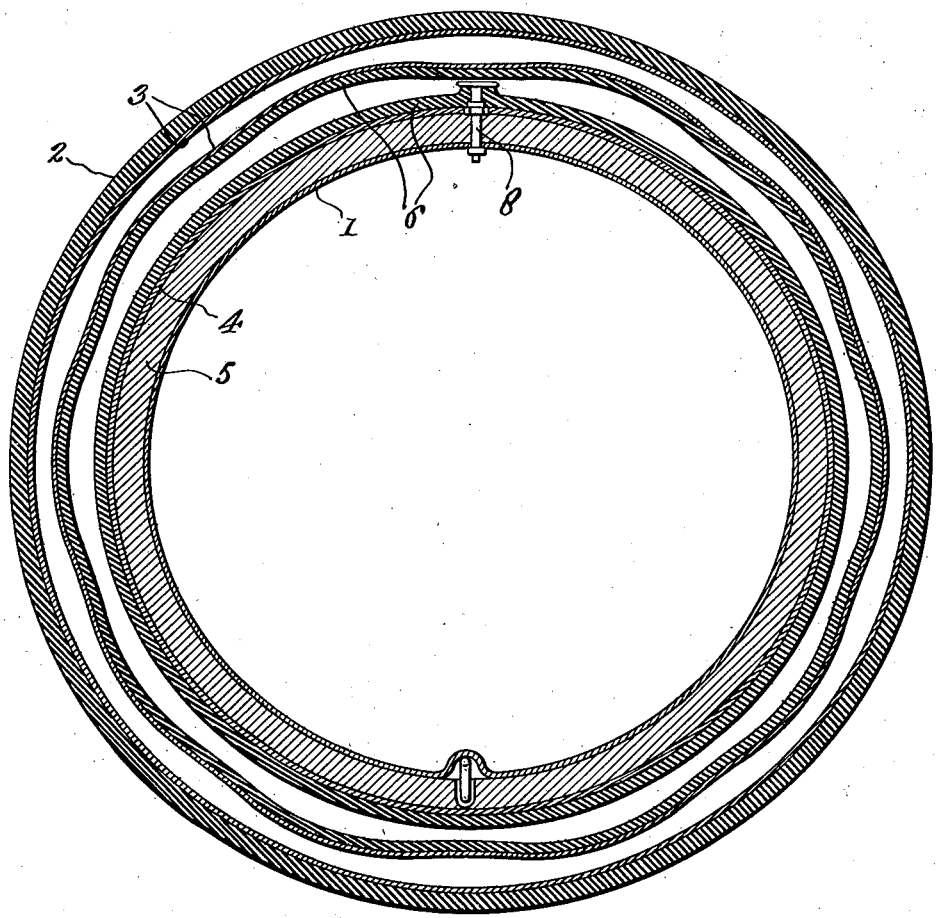
Figure 6 is a vertical section of the tire casing, the two tubes and the rim.

In reducing the outer diameter of the air tube 6 the perimeter must remain practically constant so that it assumes some such shape as the wave like appearance shown in Figure 6. The wall of the tube being flexible, this shape is readily taken and in a tube of uniform wall strength the mean distance $S^1$ may be closely regulated.

The wall of the air tube 6 separates two spaces or chambers subject to the same pressure P. This wall is free and its deformation requires but little work due only to the rigidity of the wall. The latter is relatively weak or flexible and produces this peculiarity that the pressure P in the tube 6 is slightly less (some tenths of grams) than the pressure in the outer chamber. The difference in pressure is not essential to the above explanations, but it presents a certain advantage as it is also due to this difference in pressures that the space $S^1$ is maintained.

During use the tire, in contact with the ground or a rail, is depressed with the tendency to reduce the space $S^1$ as in Figure 3. This space is such that when the tire is subject to its normal load, there still remains a space c of some millimeters. If due to inequalities in the ground, additional load or a slight lowering of the pressure P, the spaces c or J are closed, it could be also produced by a deformation of the air tube 6. However, the deformed wall of the tube 6 is free, if its very low rigidity is not accounted for, in such a manner that the different members cannot be injured. To reduce frictional contact between the walls of the tube 6 and shoe 2, and between the walls of the inner tube 3 or lines disposed therebetween, a small quantity of oil, glycerine, talcum, mica, or any other suitable substance suitable for reducing the coefficient of friction of rubber may be initially placed within the tire.

The heating or loss of power occasioned by use of this invention is small and only temporary and there is no danger of pinching or bursting the tire.

If the pressure P in the outer chamber 2 falls to zero, the pressure in the air tube 6 becomes equal to p. Figure 1 shows the parts of the device in this condition and not in contact with the road or rail and without load, while Figure 4 shows the parts under the same condition, but in contact with the supporting surface and under load. In the latter position Figure 4, the casing 2 is supported on the air tube 6 and as may be easily observed from a comparison of Figures 3 and 4, the lowering of the wheel is very small. This lowering can be compared to the lowering of an automobile when its tires are deflated to two-thirds of their normal pressure, these proportions being merely exemplary for illustrating the action of the device. The device functions in the same manner as a conventional tire, and can ride without shocks and without affecting the suspension of the vehicle.

The air tube 6 cannot be dislodged or slide due to the initial clamping of it on the support 5. The tire 2 cannot be dislodged as its beads are maintained in place by the same rigid support 5. Finally, the tire cannot slide on the rim because the rigid support 5 adheres to the air tube 6 which exerts pressure thereagainst and against the shoe 2, so that one may ride without risk of spoiling the tire.

It is evident that the air tube 6, when the inner tube 3 is deflated, is subjected to a considerable strain and if one continues to ride under these conditions, as shown in Figure 4, the pressure p in tube 6 may in time fall to zero. But the tube 6 suffices to ride over an appreciable distance under these conditions and if the tube 6 becomes deflated, the lowering will not be total because the tube 6 collapses on the annular rigid support 5 and the several thicknesses of fabric and rubber tend to deaden the shock and vibration. Therefore, this structure provides a double safety device. In the case of the deflation of both the tire 2 and tube 6, one may ride very slowly without damage to the tire or damage to the vehicle.

It is evident therefore that all of the disadvantages of existing structures are eliminated or reduced to a minimum by the present invention and that the numerous advantages and objects above specified and understood from the description are attained, and that the relative volume of air of tires will not be diminished with the use of this device as the volume of the air tube 6 is added to the volume of air in the outer casing 2 when these two chambers have a pressure P greater than p. It may also be pointed out that by reason of its flexibility the air tube 6 is very easily mounted in the tire and that the rigid annular support 5 is bored, cut, or notched to permit its mounting without interference with the valves 7 and 8.

It is obvious that various changes and modifications may be made in the details of construction and design of the above specifically described embodiment of this invention without departing from the spirit thereof, such changes and modifications being restricted only by the scope of the following claims:

What is claimed is:—

1. A safety tire comprising a rim, a casing on the rim, a specially shaped inner tube, a support on the rim within the casing, a reinforced air tube in the casing on the support and being of less diameter in cross section than that of the casing, said reinforced inner tube having an inherent stiffness for maintaining the same prior to inflation in contact with the tread portion of the casing, an air valve for the air tube to admit thereto air under pressure to permit said tube to eventually sustain the load by itself and to limit the lowering if the casing is deflated, a distinct air valve for the casing to admit, thereto and about the unsupported sides of the air tube, air under pressure sustaining load, said pressure being higher than that admitted within the air tube, to deform said tube and maintain, in addition to the interposition of the inner tube, the outside walls of said tube out of contact with the casing and avoid the air tube to be collapsed with the casing.

2. A safety tire, comprising a rim, a casing, a specially shaped inner tube, an annular support in the casing, a reinforced air tube mounted on the support in the casing and being less in cross section as compared to the casing, said reinforced tube having an inherent stiffness for maintaining the same prior to inflation in contact with the tread portion of the casing member, a valve for the tube to admit a load sustaining air pressure in the tube, a separate valve for the casing to admit a load sustaining air pressure in the casing about the tube to deform the tube out of contact with the casing, said tube adapted to take up the load upon deflation of the casing and prevent complete collapse of the casing, and a cushioning flap disposed between the tube and the support to protect the air tube and the specially shaped inner tube from possible deteriorations about the joints and gaps formed in assembling the different sections of the annular support and in the juxtaposition of said support with tire beads.

3. A safety tire, comprising a rim, a casing, a specially shaped inner tube, an annular rigid support mounted upon the rim, a reinforced air tube having a body core of layers of fabric disposed to inherently hold the tube in clamping engagement in the support and the inner tube in contact with the tread portion of the casing before inflating, a valve for the reinforced inner tube to admit air thereto for maintaining the desired load sustaining pressure in the tube and for increasing the clamping action of the tube on the support and its contact against the casing, an independent air valve for the casing to admit air thereto under desired pressure for sustaining the load and deforming the tube out of contact, in normal time, with the casing, whereby the air volume in the tube may add without mixing with the air volume in the casing for sustaining the load without deforming the tube upon normal deformation of the casing, said tube adapted to support the casing and the load upon deflation of the casing, and said support adapted to support the tube and the casing upon deflation of both of the same and constitute a second safety.

4. In a safety device for tires, the combination of a rim having a casing mounted thereon, an annular support on the rim within the casing, a reinforced air tube mounted on the support within the casing, an inner tube enclosing the air tube about the unsupported sides of the air tube, said air tube having an inherent stiffness for maintaining the same and the inner tube prior to inflation in contact with the tread portion of the casing, and independent valve means for the inner tube and for said air tube, whereby the tubes may be inflated, the inner tube being inflated so as to deform the air tube and place a body of air between the air tube and the casing.

PIERRE MARCEL BOURDON.